April 13, 1965  S. WELTYK  3,177,978
BRAKE VIBRATION ELIMINATOR
Filed April 2, 1962
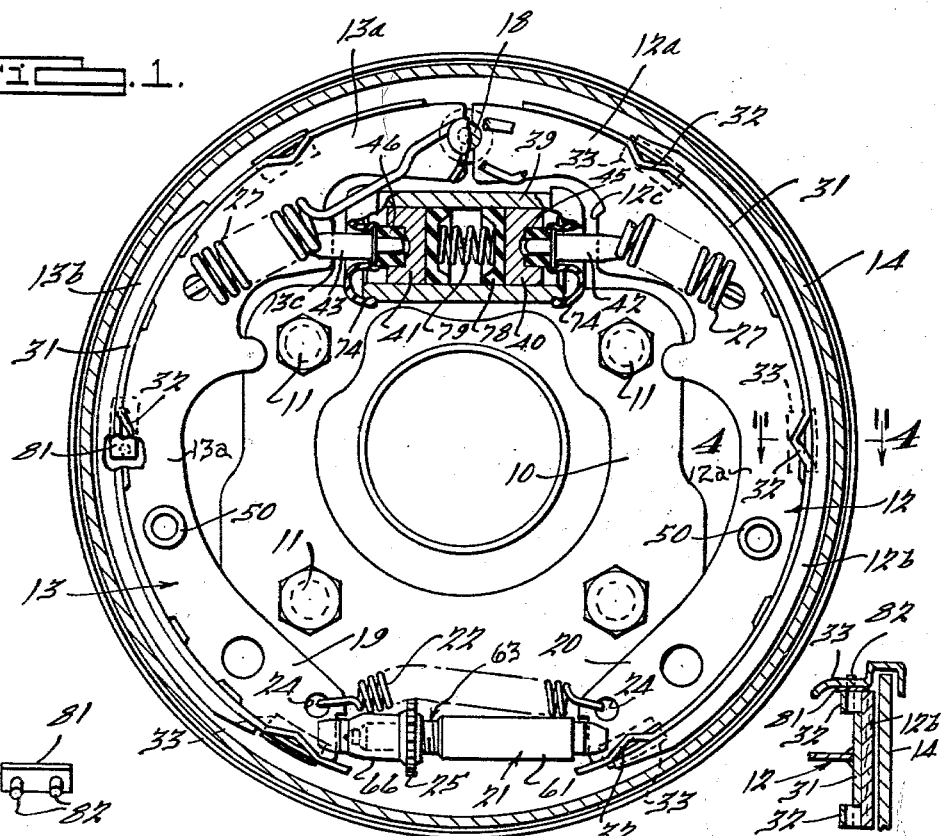
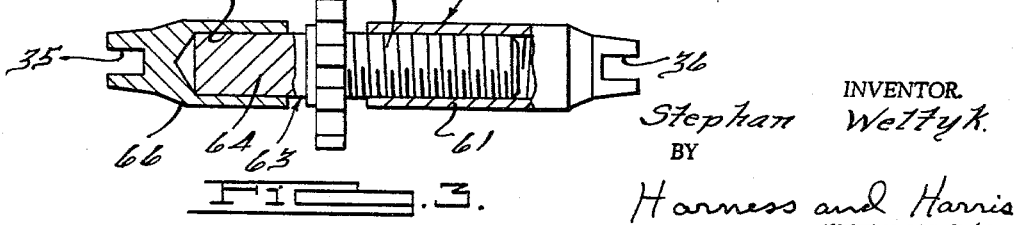
INVENTOR.
Stephan Weltyk.
BY
Harness and Harris
ATTORNEYS.

United States Patent Office 3,177,978
Patented Apr. 13, 1965

3,177,978
BRAKE VIBRATION ELIMINATOR
Stephan Weltyk, Detroit, Mich., assignor to Chrysler Corporation, Highland Park, Mich., a corporation of Delaware
Filed Apr. 2, 1962, Ser. No. 184,300
5 Claims. (Cl. 188—78)

This invention relates to a resilient linkage means for eliminating those noises and impulses denominated brake grab, brake squeak or brake squawk which vibrations frequently occur when the shoes of a brake, such as a vehicle wheel brake, are applied to the associated brake drum. Certain of the noise and impulse producing vibrations that are generated during braking appear to be transmitted through the shoe applying linkage and through the plate supported side edges of the brake shoe rims to the brake backing or support plate such that they are detectible by the passengers of the vehicle and are thereby objectionable.

This invention provides a damping means such that various vibrations set up by the brake shoes during brake application will be damped by resilient means forming a part of the brake shoe actuating means.

It is an object of this invention to incorporate a resilient means in the linkage connecting the brake shoe actuators with the associated brake shoes such that there will be a damping of certain objectionable vibrations generated during brake application. This invention also includes sound insulating means that will eliminate direct transmission of shoe vibrations to the brake support plate during braking operations.

It is a primary object of this invention to provide a compressible, resilient, rubber-like sleeve element between the brake shoe and the associated actuator piston of a hydraulically actuated brake mechanism arranged such that the sleeve element will transmit this initial brake applying force and initially flex and damp out any objectionable vibrations during initial brake application after which the linkage associated with the sleeve element will become rigid for direct application of the piston applied force that produces shoe application to the associated brake drum.

It is still another object of this invention to provide sound insulating, permanently lubricated, bearing seats for the brake shoes on the associated backing or support plate that will damp sound or impulse producing vibrations of the shoes and insure freedom of movement of the shoes relative to the backing plate during brake application.

Other objects and advantages of this invention will be readily apparent from a reading of the following description and a consideration of the related drawings wherein:

FIG. 1 is a side elevational view, partly in section, of a servo-type brake embodying this invention;

FIG. 2 is an enlarged sectional elevational view of the hydraulically operated wheel cylinder of the brake mechanism shown in FIG. 1, which wheel cylinder includes the resilient means that accomplishes damping of sound producing braking vibrations;

FIG. 3 is an enlarged sectional elevational view of the interconnecting adjustable link or strut betwen the heel ends of the two brake shoes of the brake mechanism shown in FIG. 1;

FIG. 4 is an enlarged, fragmentary, sectional elevational view taken along the line 4—4 of FIG. 1 showing the backing plate support of the brake shoes;

FIG. 5 is a perspective view of one of the backing plate shoe supporting bearing blocks; and FIG. 6 is a perspective view of an alternative type of backing plate shoe supporting bearing block.

The brake mechanism shown in FIG. 1 comprises a backing plate 10 that has bolt connectors 11 adapted to be connected to an axle carrier or wheel spindle member that would carry the wheel braking mechanism. Movably mounted on the backing plate 10 are a pair of arcuate brake shoes 12 and 13 which brake shoes are adapted to be expanded radially outwardly to engage the surrounding brake drum indicated by the reference numeral 14. The heel end portions 19 and 20 of the brake shoes 12 and 13, respectively, are interconnected by an adjustable length thrust link or strut that is generally identified by the reference numeral 21. A tension spring 22 is interconnected between holes 24 in the heel ends of the brake shoes 12 and 13. This tension spring 22 maintains the heel ends of the brake shoes 12 and 13 in engagement with the slotted ends 35, 36 (see FIG. 3) of the adjustable strut linkage 21. Furthermore, the spring 22 is positioned with respect to the adjustable link 21 such that it bears against the toothed periphery 25 of the star wheel on the bolt element 63 of the adjustable linkage 21. The bearing of the spring 22 against the toothed periphery 25 of the bolt 63 prevents unintended or accidental rotation of the adjusting bolt 63. A more detailed description of linkage 21 is given hereafter.

A tension spring 27 is connected between the toe end of each of the brake shoes 12 and 13 and the anchor pin 18. Springs 27 cause the brake shoes to be retracted from braking engagement with the surrounding brake drum 14 when brake application is released. The application of the brake shoes 12, 13 to the brake drum 14 is effected through the introduction of pressurized fluid into the wheel cylinder 39. Cylinder 39 is mounted on the backing plate 10 adjacent the toe ends of the brake shoes and its piston 40, 41 are connected to the brake shoes 12, 13 respectively by thrust links 42 and 43 as will be hereafter described.

As shown in the fragmentary sectional view of FIG. 4, the side edges of the brake shoe rims 31 are provided with notched portions 32 that bear against seat portions 33 press-formed on the backing plate 10. These shoe seat portions 33 assist in guiding the movement of the brake shoes 12 and 13 as they are moved into and out of engagement with the associated brake drum 14. The top surface of the raised step or seat portion 33 of the brake drum backing plate 10 is coated with some sort of sound deadening bearing material, such as nylon or Teflon, if it is desired to insulate the edges of the brake shoe rims 31 from the backing plate 10. In the form shown in FIGS. 1–4 a bearing block insert 81 of some sound deadening, permanent lubricating material is mounted on each backing plate seat 33 by means of studs 82 pressed through holes in the backing plate seats 33. These inserts 81 prevent shoe hang-up during brake operation and also insulate the side edges of the shoe rims from the backing plate. The smooth surface of the bearing block 81 insures low frictional engagement with the edges of the shoe rims 31 and permits free movement of shoes into and out of brake drum engagement. A smooth hard steel bearing block can be used in place of the plastic blocks 81 but sound deadening is not achieved with some metal bearing blocks.

The toe ends 16 and 17 of the brake shoes 12 and 13 respectively are formed with substantially semi-circular openings at their end portions so as to matingly fit about the cylindrical anchor pin 18 (see FIG. 1). It is thought to be obvious that when pressurized fluid is applied to the interior portion 38 of the wheel cylinder 39 that the wheel cylinder pistons 40 and 41 will be expanded outwardly so as to apply a radially expanding force to the toe ends of the brake shoes 12 and 13 through the thrust link 42 and 43 respectively. From a consideration of FIG. 2, in particular, it is thought to be obvious that during initial pressurization build-up in the wheel cylinder bore portion 38 that the pistons 40 and 41 will be moved outwardly and transmit their force to their thrust links 42 and 43 through the resilient sleeve elements 45 and 46 respectively. The thrust links 42, 43 each have a reduced end stud portion that fits in the bore in the resilient sleeve 45 or 46 associated therewith. An enlarged collar 42c or 43c on the links 42, 43 bears against the outer end of the associated resilient sleeve 45 or 46 to provide the means for compressing the sleeves 45, 46 during brake application. As the brake shoes 12, 13 are brought into engagement with the surrounding brake drum 14 then there is a progressive compression of the resilient sleeves 45 and 46 as the braking pressures increase until the thrust link inner ends 42a, 43a seat on the respective piston seats 40a and 41a. At the same time that the brake shoes 12, 13 are being applied to the brake drum 14, the rotating drum 14 causes a servo braking action to develop. This servo action results from the brake shoes being picked up by the rotating brake drum and moved circumferentially in the direction of drum rotation so as to anchor the toe end of one of the brake shoes against the anchor post 18 to provide the reaction point for the shoe braking action. From the foregoing description it is thought to be clear that during the initial application of the brake shoes 12, 13 that the inner ends 42a and 43a of the studs 42 and 43 respectively are not in direct engagement with the seat portions 40a and 41a of the pistons 40 and 41 respectively and as a result the wheel cylinder generated force that is being applied to the brake shoes is through the compressible resilient sleeves 45 and 46 that can act as vibration damping means.

From the preceding description of the wheel cylinder actuated thrust links 42, 43 and their associated resilient sleeve members 45, 46, it is thought to be clear that during initial brake application, when the brake shoes are first brought into braking contact with the associated brake drum 14, there will be a compressional flattening and deformation of the elongated sleeves 45, 46 during which time the resilient sleeves act to damp any vibrations that may develop due to uneven, intermittent, or non-conforming contact of the brake shoe friction surfaces 12b and 13b with the associated brake drum 14. It is believed that this compression of the resilient sleeves 45, 46 absorbs or damps those impulse and/or sound producing vibrations generated during braking contact between the brake shoes 12, 13 and the brake drum 14 when the braking pressures are relatively low. As the braking pressures increase and the brake shoe linings 12b, 13b are forced into conforming engagement with the friction surface of brake drum 14, the resilience of the sleeves 45, 46 is no longer required because the impulse or sound producing vibrations are no longer generated and thus the stud ends 42a and 43a of the thrust links 42, 43 then seat on the seat portions 40a and 41a of the wheel cylinder pistons. At this time there is a direct, rigid, force-transmitting connection between the pistons 40, 41 and the brake shoes 12, 13.

While in the case shown thrust links 42, 43 have their slotted ends 42b and 43b engaged with the shoe web portions 12d, 13d, still, it would be possible to directly seat a finger portion 12c, 13c of the brake shoe webs directly against the resilient sleeves 45, 46 and thus eliminate the use of the separate thrust links 42, 43. In such a case the finger portion of the brake shoe web would come to rest against the piston seat portions 40a, 41a of the wheel cylinder pistons during moderate and heavy brake application in the same manner as the stud portions 42a and 43a when the braking pressures reach relatively high intensities.

FIG. 3 shows the shoe positioning adjusting linkage 21 that interconnects the heel ends 19, 20 of the brake shoes 12 and 13. This adjusting linkage consists of a sleeve-type member 61 that has a slotted outer end 36 that is adapted to matingly receive the heel end of the web 20 of the brake shoe 12 to prevent relative rotation therebetween.

The sleeve 61 is internally threaded so as to receive the threaded stud portion 62 of the adjusting bolt 63. The other end 64 of bolt 63 is rotatably journaled in the bore 65 of the sleeve member 66. Sleeve 66 has a slot 35 to receive the heel end of shoe web 13a to prevent relative rotation therebetween. A star-wheel portion 25 is formed on the bolt 63 intermediate the bolt portions 62 and 64. The toothed periphery of the star-wheel portion 25 facilitates rotation of bolt 63 to adjust the brake shoes. As the adjusting bolt mechanism 21 does not form a part of this invention and as it is a conventional type used in servo-type brakes, it is not thought that any additional description of this mechanism need be given.

With the resilient damping sleeves shown in FIGS. 1 and 2, it will be noted that the sleeves 45, 46 are partially countersunk in bore formations 70 formed on the outer ends of the pistons 40, 41. The outer end portions of the resilient sleeves 45, 46 that are not enclosed by the piston bores 70 are quite free to be compressed and deformed during brake application while the bore confined portions of the sleeves may be deformed to a lesser degree. Furthermore, from a standpoint of rigidity, the resiliency of the sleeves 45 and 46 is such that by the time relatively high braking force is needed the stud ends 42a, 43a of the studs 42, 43 are seated against the seat portions 40a, 41a of the wheel cylinder pistons so that a rigid linkage is established for transmitting the braking force from the wheel cylinder pistons to the brake shoes that by-pass the compressed resilient sleeves.

As can be seen from FIG. 2 the outer ends of the wheel cylinder 39 are covered by boots 74 having inner ends 73 that sealingly engage about the thrust links 42, 43. Boots 74 have their other end portions 76 shaped to seat in grooves 75 formed around the periphery of the ends of the wheel cylinder 39. The wheel cylinder 39 is of substantially standard construction and is not thought to require detailed description. There is provided on the inwardly disposed sides of the pistons 40, 41 the usual sealing cup members 78 that are urged into engagement with the inner sides of the pistons 40, 41 by means of the compression spring 79. An opening 80 in cylinder 39 represents the port that feeds pressure fluid from the master cylinder (not shown) to the wheel cylinder 39.

The brake shoes 12 and 13 that are seated on the several backing plate seat formations 33, are resiliently held in position on the seats 33 by means of the brake shoe hold-down springs 50 which may be of any conventional type. The springs 50 permit radial movement and/or some circumferential movement of the brake shoes with respect to the backing plate 10.

One of the particular advantages of this type of brake vibration eliminator means over noise eliminators of other known types is that by this piston carried means the entire length of both shoes is effectively isolated from the wheel cylinder and backing plate by a resilient damping means located at the very connection of shoe toe ends to the wheel cylinder pistons. Not only are vibrations prevented from being transmitted to the backing plate 10 through the wheel cylinders but the edges of the brake shoes are also effectively isolated from the backing plate. Furthermore, the damping can be controlled by and coordinated with the braking pressures being applied so that the resilient damping means in the shoe actuating linkage can be eliminated at a preselected time or value. This invention provides an easy manner of varying the damping with different brake sizes and designs by merely varying the resilience or hardness of the rubber-like sleeves 45, 46 used in accordance with this invention. Different sleeves with different resilience can be used for the primary and secondary shoe pistons in servo-type brake units.

FIG. 5 is a perspective view of the backing plate bearing block 81 that is shown in FIG. 1. FIG. 6 shows an alternative type of bearing block 91 that can be pressed into or otherwise secured to the backing plate 10 in the same manner of the bearing block 81. Block 91 has a single leg 92 that is forced through an undersized bore in the backing plate 10. Block 91 can be either a sound deadening plastic material or a polished or smooth surfaced metal bearing block for the shoe rim edges 31.

I claim:

1. In a brake mechanism comprising a support, a brake shoe movably mounted on said support having a first portion arranged to react against said support and a second spaced portion connected to a brake shoe actuating means, and a linkage interconnecting said brake shoe second portion with said shoe actuating means, said linkage comprising a rigid thrust link having a resilient sleeve surrounding the end portion thereof that is engageable with the shoe actuating means, said resilient sleeve normally projecting beyond the said link end portion and being arranged for a predetermined deformation during initial brake application after which said shoe thrust link by-passes said resilient sleeve and becomes rigidly connected to said shoe actuating means.

2. In a brake mechanism comprising a support plate, a brake shoe anchor fixed to said support plate, a brake shoe movably mounted on said support plate having one end portion reacting against said anchor, a pressure fluid operated brake shoe actuating means mounted on said support plate adjacent the other end of said brake shoe, and linkage means comprising a rigid thrust link having a compressible, resilient, rubber-like tip portion operatively connecting said shoe actuating means to said other end of said brake shoe to transmit brake applying thrust thereto, said compressible resilient tip portion of said thrust link being arranged to have a limited deflection to damp vibrations transmitted thereto during initial brake application after which said tip portion is compressed by the braking thrust so as to be by-passed and said rigid thrust link seats on and directly connects said shoe actuating means and said shoe other end.

3. In a brake mechanism comprising a support plate, a brake shoe anchor fixed to said support plate, a brake shoe movably mounted on said support plate having one end portion reacting against said anchor, a pressure fluid operated brake shoe actuating means mounted on said support plate adjacent the other end of said brake shoe, and linkage means comprising a rigid thrust link having a compressible, resilient, rubber-like tip portion operatively connecting said shoe actuating means to said other end of said brake shoe to transmit brake applying thrust thereto, said compressible resilient tip portion comprising a sleeve surrounding and projecting beyond the rigid link end on which it is mounted and being arranged to have a limited deflection to damp vibrations transmitted thereto during initial brake application after which said tip portion is compressed by the braking thrust to such a degree that it is by-passed and said rigid thrust link seats on and directly connects the shoe actuating means and the shoe other end, said resilient tip member being operative to transmit thrust only when relatively low brake applying pressures are acting.

4. In a brake mechanism, a support plate, a shoe anchor formation on said support plate, a brake shoe movably mounted on said support plate for actuation into engagement with a brake drum, one end of said shoe being arranged to react against said shoe anchor and the other end of said shoe adapted to be connected to a shoe actuating means, a hydraulic wheel cylinder shoe actuation means mounted on said support plate adjacent said other end of said shoe comprising a pressure fluid actuated reciprocable piston having a bore in its exposed outer end, a resilient, rubber-like sleeve mounted in said piston bore so as to extend outwardly therefrom, and a rigid thrust link extending between the outer end of said resilient sleeve and said other end of said brake shoe to transmit initial braking thrust therebetween, said thrust link having a portion extending inwardly through a portion of the bore in said sleeve and normally out of contact with said piston but arranged to seat on said piston and provide a rigid connection between said piston and brake shoe after a predetermined compression of said resilient sleeve by the braking thrust applied to said thrust link.

5. In a servo brake mechanism, a support plate, a shoe anchor formation on said support plate, a pair of brake shoes floatingly mounted on said support plate and arranged in annular formation for actuation into engagement with a surrounding brake drum, one pair of adjacent ends of said shoes being arranged to react against said shoe anchor and the other pair of adjacent ends of said shoes being connected together by a floating, adjustable length link, a hydraulic wheel cylinder for shoe actuation mounted on said support plate adjacent said first mentioned pair of ends of said shoes comprising a pair of opposed, pressure fluid actuated, reciprocable pistons each having a resilient sleeve on its exposed outer end, and a rigid thrust link extending between the outer end of each sleeve and the end of the brake shoe adjacent thereto to transmit initial braking thrust therebetween, said thrust link being seated on the outer end of said resilient sleeve and having a portion extending inwardly through a portion of the bore in said resilient sleeve and normally out of contact with said piston but arranged to seat on said piston and provide a rigid connection between said piston and brake shoe after a predetermined compression of said sleeve by the braking thrust applied to said rigid thrust link.

References Cited by the Examiner
UNITED STATES PATENTS

| 1,707,742 | 4/29 | Schjolin | 188—152.82 |
| 1,791,495 | 2/31 | Frey | 188—218 |
| 1,797,061 | 3/31 | Gunn | 74—581 |
| 1,841,696 | 1/32 | Andres | 188—217 |
| 1,940,449 | 12/33 | Dodge | 188—218 |
| 2,422,327 | 6/47 | Winslow | 287—85 X |
| 2,436,908 | 3/48 | Van Weenen et al. | 287—20 |
| 2,730,204 | 1/56 | Pratt | 188—152.82 |
| 2,776,864 | 1/57 | Powlas | 188—152.82 |
| 2,785,534 | 3/57 | Tucker | 188—152.82 X |
| 3,035,666 | 5/62 | Beeskow | 188—217 |

FOREIGN PATENTS 1,081,788 7/56 Germany.

ARTHUR L. LA POINT, *Primary Examiner.*

A. JOSEPH GOLDBERG, DUANE A. REGER,
*Examiners.*